United States Patent [19]

Herbrechtsmeier et al.

[11] Patent Number: 4,991,932

[45] Date of Patent: Feb. 12, 1991

[54] OPTICAL WAVEGUIDE

[75] Inventors: Peter Herbrechtsmeier, Königstein/Taunus; Gerhard Wieners, Frankfurt; Jürgen Kuhls, Burghausen; Herbert Fitz, Burgkirchen; Manfred Tschacher, Emmerting, all of Fed. Rep. of Germany

[73] Assignee: Hoechst Aktiengesellschaft, Frankfurt am Main, Fed. Rep. of Germany

[21] Appl. No.: 344,006

[22] Filed: Apr. 26, 1989

[30] Foreign Application Priority Data

Apr. 28, 1988 [DE] Fed. Rep. of Germany ....... 3814295

[51] Int. Cl.$^5$ ............................ G02B 6/00; D02G 3/00
[52] U.S. Cl. ................................ 350/96.34; 350/96.30; 428/373; 428/394
[58] Field of Search ............... 428/373, 374, 375, 394; 350/96.29, 96.30, 96.34; 526/254

[56] References Cited

U.S. PATENT DOCUMENTS

| | | | |
|---|---|---|---|
| 2,968,649 | 1/1961 | Pailthorp et al. | 526/222 X |
| 3,993,834 | 11/1976 | Chimura et al. | |
| 4,123,603 | 10/1978 | Stewart, Jr. | 526/254 |
| 4,521,483 | 6/1985 | Sasaki et al. | 428/373 |
| 4,564,263 | 1/1986 | Ueba et al. | 350/96.34 |
| 4,568,146 | 2/1986 | Ueba et al. | 428/394 X |
| 4,708,833 | 11/1987 | Ohsawa et al. | 264/174 X |
| 4,747,662 | 5/1988 | Fitz | 350/96.34 |
| 4,756,599 | 7/1988 | Maeda et al. | 428/373 X |
| 4,775,590 | 10/1988 | Sakagami et al. | 428/373 |
| 4,807,964 | 2/1989 | Sare | 350/96.34 |
| 4,842,369 | 6/1989 | Teshima | 428/373 X |

FOREIGN PATENT DOCUMENTS

| | | |
|---|---|---|
| 97325 | 1/1984 | European Pat. Off. |
| 154339 | 9/1985 | European Pat. Off. |
| 0171294 | 12/1986 | European Pat. Off. |
| 60-81213 | 9/1985 | Japan ............ 526/254 |
| 61-159410 | 7/1986 | Japan ............ 526/254 |
| 888765 | 2/1962 | United Kingdom ... 526/254 |

*Primary Examiner*—Lorraine T. Kendell

[57] ABSTRACT

An optical waveguide having a core-sheath structure whose core comprises a terpolymer based on vinylidene fluoride, tetrafluoroethylene and hexafluoropropylene, is suitable for transmission paths of ca. 10 to ca. 100 m and can also be used at a temperature of above 100° C. without significant reduction of the transmission path.

6 Claims, No Drawings

OPTICAL WAVEGUIDE

The invention relates to optical waveguides (OWG) which are suitable for the transmission of light, for example of light signals for data transmission.

The optical waveguides comprise a core and a sheath, both of which comprise (different) transparent materials, the core material always having a refractive index at least one percent higher than the sheath material. The optical waveguide is generally filamentary and has a circular cross-section. A sheath material having an annular cross-section is applied as a thin layer to the filamentary core.

The materials most frequently used until now for optical waveguides are homopolymers and copolymers of methacrylates for the core and homopolymers and copolymers of methyacrylates of alcohols containing fluorine or copolymers of vinylidene fluoride with other monomers containing fluorine, for the sheath.

Optical waveguides are known, whose core comprises homopolymers or copolymers of methyl methacrylate (MMA), of styrene or comprises methacrylates of aliphatic alcohols. The sheath of this optical waveguide comprises copolymers or terpolymers of vinylidene fluoride (VdF), tetrafluoroethylene (TFE) and/or hexafluoropropylene (HFP) (cf. EP-A 154 339, EP-A 97 325, DE-A 24 55 265).

Moreover, it is known that the long term service temperature of optical waveguides whose core or sheath comprises a suitable polymer can be improved by treatment with ionizing radiation. It is also known, however, that polymers which contain MMA are turned yellowish-brown by the action of ionizing radiation. The transparency of the core material is thus impaired and the polymer chains of PMMA are degraded by the action of ionizing radiation.

Finally it is known that polymers which contain VdF can be crosslinked after thermoplastic processing by reaction of the polymer with the compound dimethylmethoxyvinylsilane and by the action of water, (cf. DE-A 33 27 596).

The object was to provide a transparent polymer material made from easily accessible monomers for producing optical waveguides which are suitable for transmission paths of 10 to 100 meters at wavelengths of 650 and 780 nm and which can also be used at a temperature above 100° C. without significant reduction of the transmission path.

It has been found that this object may be achieved by an optical waveguide whose core comprises a polymer based on vinylidene fluoride, tetrafluoroethylene and hexafluoropropylene.

The invention thus relates to an optical waveguide having a core/sheath structure whose core comprises a polymer with a refractive index n(C) and whose sheath comprises a polymer with a refractive index n(S), where n(C)/n(S)>1.01, wherein the core comprises a polymer which contains units which, based in each case on the polymer, are derived from 30 to 50 % by weight of vinylidene fluoride, 25 to 55% by weight of tetrafluoroethylene and 15 to 25% by weight of hexafluoropropylene and the sheath comprises a polymer which contains units which are derived from vinylidene fluoride to the extent of less than 30% by weight of the polymer, tetrafluoroethylene and hexafluoropropylene or from esters of methacrylic acid or α-fluoroacrylic acid with fluorinated alcohols.

The invention further relates to a process for producing an optical waveguide having a core/sheath structure whose core comprises a polymer with a refractive index n(C) and whose sheath comprises a polymer with a refractive index n(S), where n(C)/n(S)>1.01, by extruding the core and encasing the core with a sheath, wherein the core is extruded from a polymer which contains units which, based in each case on the polymer, are derived from 30 to 50% by weight of vinylidene fluoride, 25 to 55% by weight of tetrafluoroethylene and 15 to 25% by weight of hexafluoropropylene, and the core is encased with a sheath made from a polymer which contains units which are derived from vinylidene fluoride to the extent of less 30% by weight of the polymer, tetrafluoroethylene and hexafluoropropylene or from esters of methacrylic acid or α-fluoroacrylic acid with fluorinated alcohols.

The core of the optical waveguide according to the invention comprises a polymer which contains units which are derived from vinylidene fluoride (VdF), from tetrafluoroethylene (TFE) and from hexafluoropropylene (HFP). The proportions of these units in the polymer are VdF 30 to 50, preferably 35 to 45% by weight, TFE 25 to 55, preferably 35 to 45% by weight and HFP 15 to 25, preferably 17 to 22% by weight, based in each case on the total quantity of the polymer.

These are materials which are particularly clear and transparent both in the region of 650 nm and in the region of 780 nm. In agreement with this observation, using the DSC method, no residual crystallinity—otherwise recognizable by characteristic measuring signals, which indicate the fusion of PVdF crystallites or PTFE crystallites—is in evidence, residual crystallinity often being the cause of strong light scattering by copolymers of VdF and TFE.

Polymers having a low VdF content have refractive indices of less than 1.35. Sheath materials for a core which is made from a copolymer having fewer than 30 parts by weight of VdF must thus have refractive indices of 1.335 or less. Polymer materials having refractive indices as low as this and being sufficiently transparent are not known.

Polymers having a higher VdF content are less transparent because of greater crystallinity.

The sheath of an optical waveguide according to the invention is a polymer which contains units which are derived from vinylidene fluoride, tetrafluoroethylene, hexafluoropropylene, or from esters of methacrylic acid or α-fluoroacrylic acid with fluorinated alcohols. Copolymers which are preferred are those of vinylidene fluoride, tetrafluoroethylene and hexafluoropropylene having a content of VdF units of less than 30% by weight, homopolymers and copolymers of hexafluoroisopropyl α-fluoroacrylate (HFP-FA), perfluoroisopropyl α-fluoroacrylate (PIP-FA) or perfluoro-2,3-dimethylbut-2-yl α-fluoroacrylate (PDB-FA). Particularly preferred are copolymers of vinylidene fluoride, tetrafluoroethylene and hexafluoropropylene having a composition of VdF 10 to 30, preferably 20 to 30% by weight, HFP 10 to 25, preferably 10 to 20% by weight, TFE 45 to 70, preferably 50 to 65% by weight, based in each case on the total quantity of the polymer, as well homopolymers and copolymers of hexafluoroisopropyl α-fluoroacrylate (HFIP-FA).

These materials have a refractive index $\mu$m at least 1% below the refractive index of the core material and are highly transparent.

Preferably, the polymers of the core and sheath of the optical waveguide are cross-linked, particularly when these polymers are copolymers of vinylidene fluoride, tetrafluoroethylene and hexafluoropropylene. The crosslinking can have been carried out by ionizing radiation or by modifying the polymers using moisture-sensitive reagants.

The optical waveguide according to the invention is produced by one of the following processes:

1. The optical waveguide is produced by simultaneous extrusion of the core material and of the sheath material (coextrusion) using a two component die. If desired, the optical waveguide may be subjected to the action of ionizing radiation after this process.

2. Initially the core filament is produced by extrusion. Afterwards, the sheath material is applied either in the form of a mixture of the sheath material with a volatile solvent with evaporation of the solvent or by extrusion of the sheath material using an extruder which is equipped for wire coating. In the case of solvent coating the solvent can either be suitable for producing a homogeneous solution of the sheathing polymer or for producing a dispersion or an emulsion of the sheathing polymer. In this process selective cross-linking of the core material may be carried out by ionizing radiation after extrusion of the core material and before coating with the sheath material.

3. Instead of the terpolymer made from VdF, TFE and HFP, terpolymers made from VdF, TFE and HFP which have been modified by grafting trimethoxyvinylsilane and mixed with transsilylation catalysts may be used, if desired both in the core and the sheath. Here, either the core and the sheath may be simultaneously extruded through a two component die to form the optical waveguide or the core of the optical waveguide may be subsequently coated with a sheath. In this process, cross-linking of the silane-modified terpolymer occurs spontaneously in an atmosphere containing water vapor.

Optical waveguides which contain copolymers made from VdF, TFE and HFP can be used at a temperature up to 70° C. for hours without losing optical transparency. The heat resistance of an optical waveguide of this type, defined by means of the long term service temperature, can be considerably improved if the core material or the sheath material of the optical waveguide, or both, are crosslinked.

The optical waveguide according to the invention has a high optical transparency as long as during the production of the copolymers and of the optical waveguide, all particulate solids and soluble impurities were carefully excluded. The optical transparency of a fiber of this type is generally expressed by the size of the attenuation D, the reciprocal of optical transparency, in accordance with the formula $$D = 10 \times \log (I/I_0)/1,$$

in units of dB/km. In the formula, I denotes the intensity of the light at the outlet of the optical waveguide, $I_0$ the intensity at the start of the optical waveguide and 1 the length of the optical waveguide in km.

The optical waveguides according to the invention are distinguished by having low attenuation, a high long term service temperature and high flexural strength. Moreover, these optical waveguides can be used for long transmission paths at wavelengths around 650 nm and 780 nm.

The invention is explained in more detail using the following examples, in which the attenuation of an optical waveguide is determined in the following way:

Using a suitable light source, light was introduced into one end of a 10 to 30 m long optical fiber, while at the other end the intensity of the emerging light was measured. The optical fiber was subsequently shortened in each case by an exactly determined length of about 1 meter and the emerging light intensity was measured again. The attenuation can be determined from the gradient using a logarithmic plot of the measured light intensities against the corresponding length of optical waveguide.

For the duration of the measurement of the temperature dependence of attenuation, the connections between the light source and the light detector and the optical waveguide were not altered, but merely an exactly determined part of the optical waveguide was maintained at the measuring temperature in an air bath in a climatic test cabinet. The variation of attenuation in the temperatureconditioned part of the optical waveguide can be calculated from the weakening in the light intensity at the outlet of the optical waveguide and from the length of the temperature-conditioned section of filament.

For measuring flexibility, the connections between the light source and the light detector and the optical waveguide were not altered after the first measurement of the emerging light intensity. A part of the optical fiber in the middle of the measured section was wound three times around a cylindrical rod and unwound again from the rod and subsequently the intensity of the emerging light was measured. If the intensity of the light had not reduced or not significantly reduced, the procedure was repeated with a rod of smaller diameter. The smallest bending radius admissible without impairment of the quality of the optical waveguide is a measure of the flexibility of the optical waveguide.

EXAMPLE 1

Initially, a copolymer made from TFE, HFP and VdF was produced in a known manner in a suspension process. The aqueous liquor contained perfluorooctanoic acid as emulsifier and potassium hydrogen sulphate as buffer. Ammonium persulphate was the initiator. 40% by weight of TFE, 20% by weight of HFP and 40% by weight of VdF were polymerized at a temperature of 70° C. and a pressure of 9 bar. Diethyl malonate was the regulator.

The product was soluble in methyl ethyl ketone and other solvents. A 1% strength solution had a reduced specific viscosity at 25° C. of 87 cm$^3$/g. A weight average molecular weight of 177,000 was determined using gel permeation chromatography (in tetrahydrofuran as solvent, measured using a calibration curve from standard preparations of polystyrene). The composition of the polymer was determined by 19-F-NMR spectroscopy as 40 parts by weight of TFE, 20 parts of HFP and 40 parts of VdF. The refractive index of the copolymer was $n_D^{25} = 1.366$.

Only very small proportions of crystallinity were detectable by DSC.

EXAMPLE 2

100 parts by weight of hexafluoroisopropyl α-fluoroacrylate (HFIP-FA) were carefully purified by distillation and filtration over a fine-pored membrane filter and mixed with 0.1 part by weight of tert.-butylperoxyisopropyl carbonate and 0.5 part of butylene dimercaptan and continuously added to a stirred vessel maintained at 90° C. The resulting syrup-like mixture was continuously transferred to a twin screw extruder, in which the polymerization was completed at a temperature of 110° to 150° C. Volatile components were removed in vacuo in a degassing zone. The resulting poly(hexafluoroisopropyl α-fluoroacrylate) (poly(HFIP-FA)) was used in this and in the following examples for producing the sheath for polymeric optical waveguides.

A copolymer made from VdF, TFE and HFP was produced as in Example 1 and melted in a twin screw degassing extruder, while poly(hexafluoroisopropyl fluoroacrylate) (poly HFIP-FA)) was melted in a single screw extruder. The VdF copolymer was processed to form the core of an optical waveguide and the poly(HFIP-FA) was processed to form the sheath, in a two component spinneret. The operational settings of the spinning plant were regulated in such a way that a fibre 1 mm in diameter was produced, having a sheathing layer 10 μm thick. At room temperature, the optical waveguide had an attenuation of 800 dB/km at 650 nm, and of 620 dB/km at 780 nm.

In order to test the long term service temperature, the attenuation was measured at various temperatures between room temperature and up to 140° C., over several hours in each case. At 70° C., the attenuation increased slightly during the measuring period to a value of 870 dB/km at 650 nm. At more elevated temperature the attenuation increased so markedly, that the polymer fibre was no longer usable as an optical waveguide.

The minimum permissible bending radius, found by flexibility testing, was 15 mm.

COMPARATIVE EXAMPLES A AND B

Copolymers were produced in the same manner as described in Example 1, the compositions of which are given in Table 1. As described in Example 2, optical waveguides were produced from these polymers as the core material and poly(HFIP-FA) as the sheath material; the properties of these waveguides are also presented in Table 1.

Optical waveguides having sufficiently low attenuation could not be produced from any of these copolymers.

TABLE 1

| Comparative example | Composition VdF | HFP | TFE | Attenuation (dB/km) | Remarks |
|---|---|---|---|---|---|
| A | 60 | 20 | 20 | 1200 | at 70° C.: 300 dB/km. The copolymer is soft and tacky. |
| B | 40 | — | 60 | 2500 | DSC: partially crystalline |

EXAMPLE 3

A copolymer made from 45 parts by weight of VdF, 20 parts of TFE and 35 parts of HFP and produced in the same manner as described in Example 1, was introduced into a twin screw degassing extruder and extruded to form the core, a copolymer made from 40 parts by weight of perfluoro-2,2-dimethylbut-2-yl α-fluoroacrylate (PDB-FA) and 60 parts by weight of HFIP-FA to form the 10 μm thick sheath of an optical waveguide having a diameter of 1 mm. The optical waveguide had an attenuation of 800 dB/km at 650 nm, which increased to 850 dB/km at 70° C. At 780 nm, 640 dB/km was measured at 25° C. and 690 dB/km at 70° C.

EXAMPLE 4

A copolymer made from 40 parts by weight of VdF, 20 parts of HFP and 40 parts of TFE was processed to form the 1 mm thick core of an optical waveguide and cross-linked by the action of 200 kGy of Co-60 irradiation.

This optical waveguide core was subsequently fed through a circular capillary opening 1.2 mm in diameter in the floor of a vessel which was filled with a solution of 10 parts by weight of a copolymer made from 20 parts by weight of PDB-FA and 80 parts by weight of HFIP-FA in dry methanol. Immediately after emerging from the capillary opening, the coated fiber was led through an air bath, which was maintained at a temperature of 70° C. by means of radiant heaters. The methanol was thereby evaporated, and a firmly bound 20 μm thick layer of the copolymer made from the two esters of fluoroacrylic acid resulted on the optical waveguide.

The optical waveguide having a core/sheath structure obtained in this way had a light attenuation of 1050 dB/km at 650 nm, and 920 dB/km at 780 nm. The attenuation remained constant up to a temperature of 70° C. and increased at more elevated temperature to 1200 dB/km at 120° C. and 650 nm. If the optical waveguide was cooled again, the attenuation fell back again to the initial value. The attenuation did not increase after the optical waveguide had been wound around a rod having a diameter of 15 mm.

COMPARATIVE EXAMPLE C

An optical waveguide having a core/sheath structure was produced from the materials and in the manner described in Example 4, directly from the two component spinning process, and subsequently treated with 200 kGy of Co-60 irradiation.

The optical waveguide produced in this manner had an attenuation of 1100 dB/km at 650 nm and 25° C. The attenuation increased to a value of greater than 2000 dB/km after the optical waveguide had been wound around a circular rod 50 mm in diameter. At this point the light introduced into the optical waveguide shone out and a great part of the transmitted light intensity was lost. At this point cracks in the sheath material, and points where the sheath had separated from the core could be seen with the optical microscope.

EXAMPLE 5

A copolymer made from 35 parts by weight of VdF, 20 parts of HFP and 45 parts of TFE was processed to form the core of an optical waveguide, while simultaneously a copolymer made from 25 parts by weight of VdF, 20 parts weight of HFP and 55 parts by weight of TFE was processed to form the sheath of an optical waveguide. Then both polymers were separately melted in each case in a single screw extruder and combined in a two component die to form the optical waveguide.

As described in Example 3, the optical waveguide was treated with 200 kGy of Co-60 irradiation. The attenuation was 1100 dB/km at room temperature, 1170 dB/km at 70° C. and 1270 dB/km at 120° C. and 650 nm. At 25° C. and 780 nm the attenuation was 830 dB/km. The attenuation increased only slightly when the optical waveguide was wound around a rod having a radius of 15 mm.

We claim:

1. An optical waveguide having a core/sheath structure whose core comprises a polymer with a refractive index n(C) and whose sheath comprises a polymer with a refractive index n(S), where n(C)/n(S) > 1.01, wherein the core comprises a polymer which contains units which, based in each case on the polymer, are derived from 30 to 50 % by weight of vinylidene fluoride, 25 to 55% by weight of tetrafluoroethylene and 15 to 25% by weight of hexafluoropropylene and the sheath comprises a polymer which contains units which are derived from vinylidene fluoride to the extent of less than 30% by weight of the polymer, tetrafluoroethylene and hexafluoropropylene or from esters of methacrylic acid or α-fluoroacrylic acid with fluorinated alcohols.

2. An optical waveguide as claimed in claim 1, wherein the core comprises a polymer which contains units which, based in each case on the polymer, are derived from 35 to 45% by weight of vinylidene fluoride, 35 to 45% by weight of tetrafluoroethylene and 17 to 22% by weight of hexafluoropropylene.

3. An optical waveguide as claimed in claim 1, wherein the sheath comprises a polymer which contains units which, based in each case on the polymer, are derived from 10 to 30% by weight of vinylidene fluoride, 45 to 70% by weight of tetrafluoroethylene and 10 to 25% by weight of hexafluoropropylene.

4. An optical waveguide as claimed in claim 1, wherein the sheath is a polymer which contains units which are derived from esters of methacrylic acid and α-fluoroacrylic acid with fluorinated alcohols.

5. An optical waveguide as claimed in claim 1, wherein the sheath is a poly(hexafluoroisopropyl α-fluoroacrylate).

6. An optical waveguide as claimed in claim 1, wherein the vinylidene fluoride-tetrafluoroethylene-hexafluoropropylene copolymer in the core or sheath of the optical waveguide is cross linked by means of ionizing radiation.

* * * * *